Figure 1:
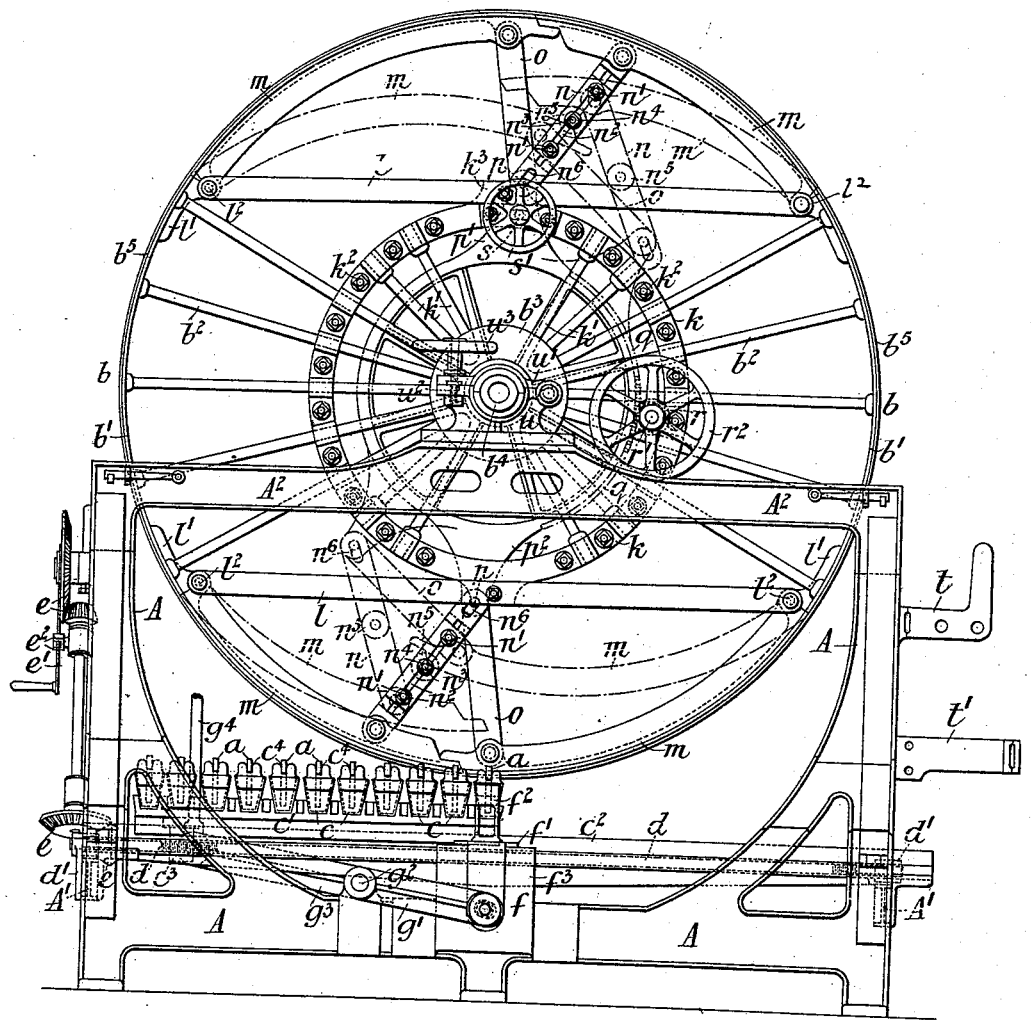

(No Model.) 6 Sheets—Sheet 1.

G. MARCHETTI & H. CROSSLEY.
MACHINE FOR PRINTING YARNS.

No. 471,561. Patented Mar. 29, 1892.

Witnesses. Inventors.

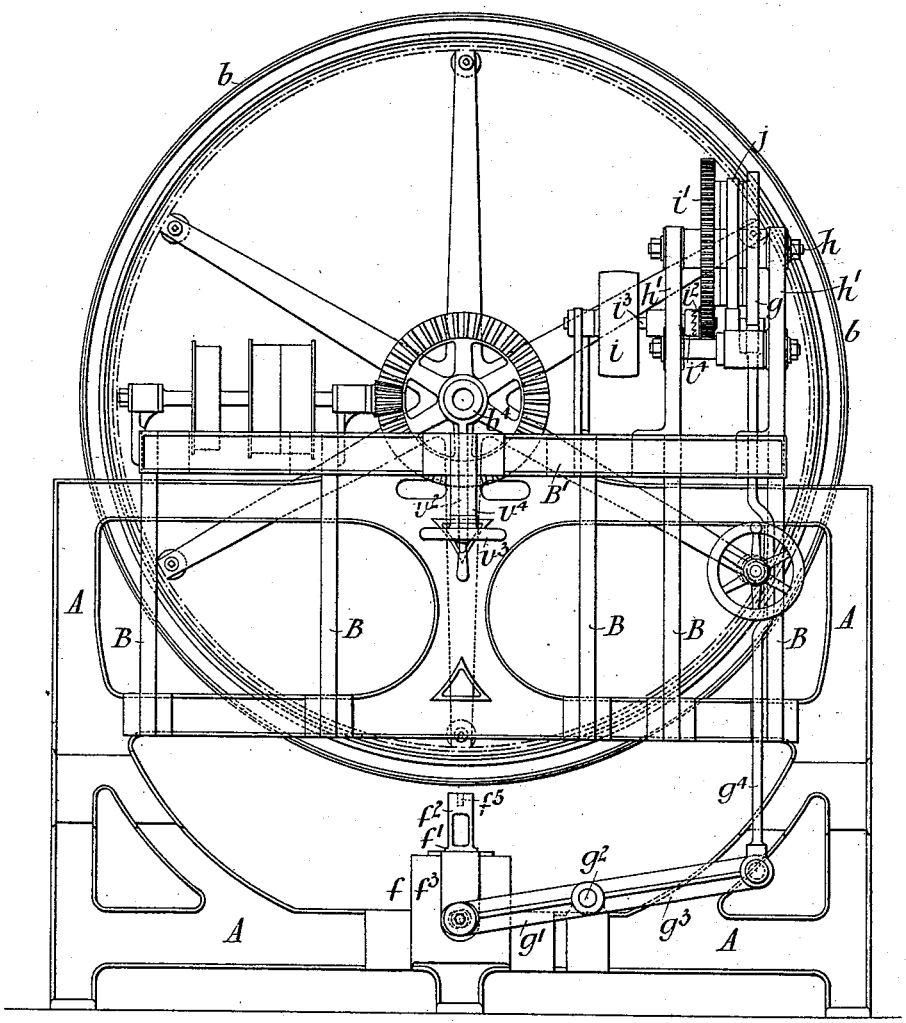

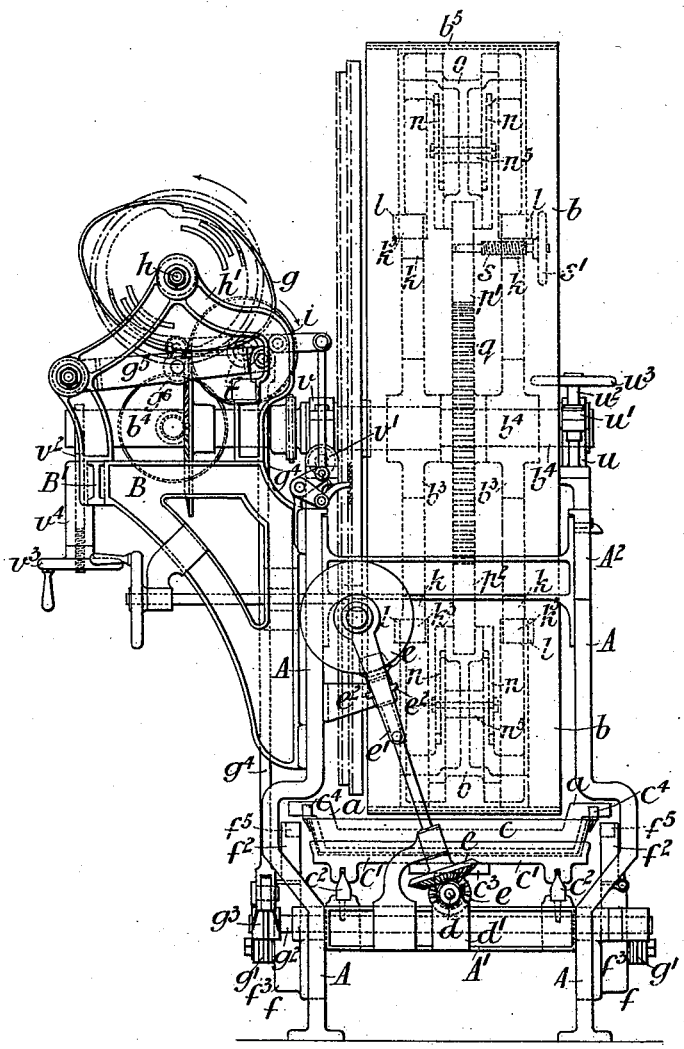

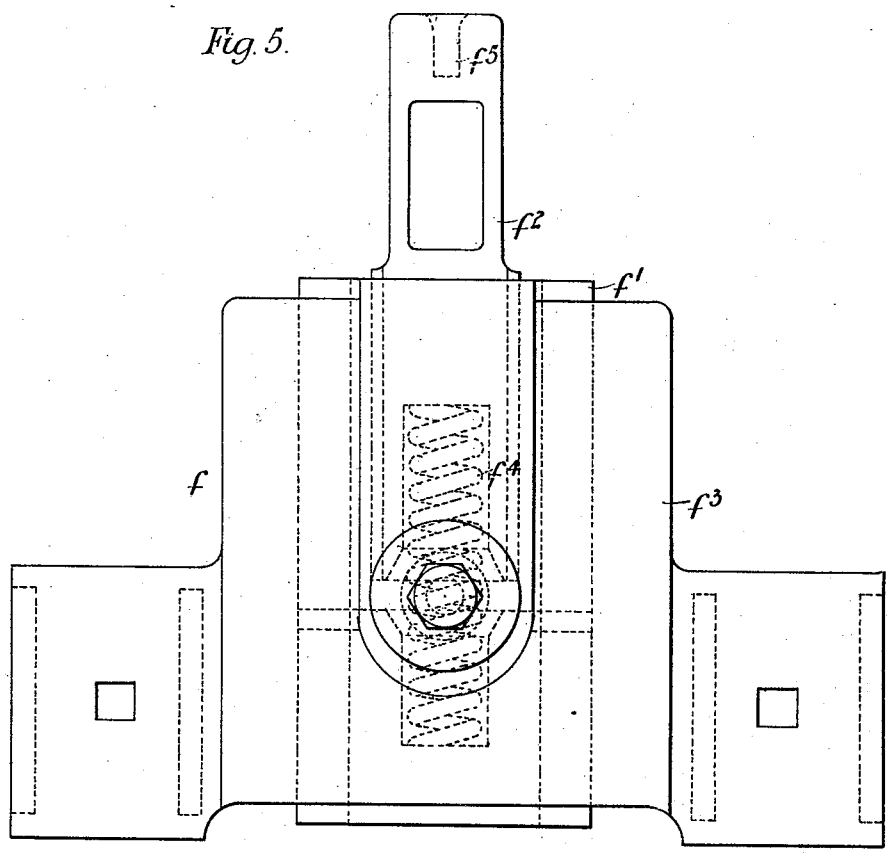
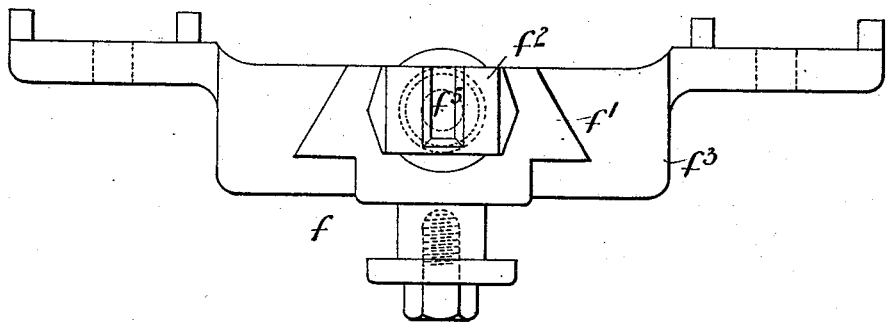

(No Model.) 6 Sheets—Sheet 5.
G. MARCHETTI & H. CROSSLEY.
MACHINE FOR PRINTING YARNS.
No. 471,561. Patented Mar. 29, 1892.
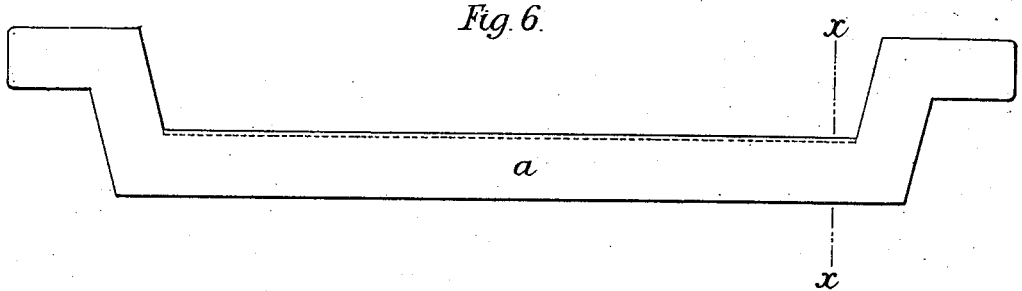
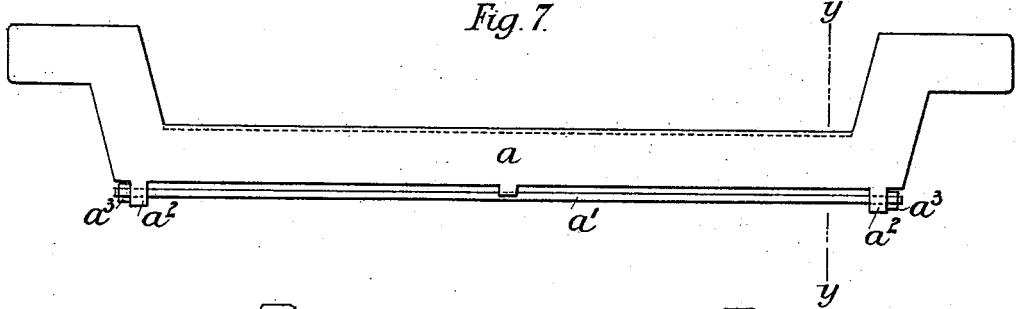
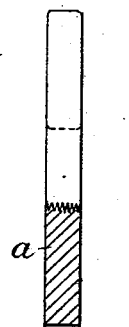
Witnesses.
Inventors.

(No Model.) 6 Sheets—Sheet 6.

G. MARCHETTI & H. CROSSLEY.
MACHINE FOR PRINTING YARNS.

No. 471,561. Patented Mar. 29, 1892.

Witnesses. Inventors.

UNITED STATES PATENT OFFICE.

GIULIO MARCHETTI, OF HALIFAX, AND HERBERT CROSSLEY, OF LONDON, ENGLAND.

MACHINE FOR PRINTING YARNS.

SPECIFICATION forming part of Letters Patent No. 471,561, dated March 29, 1892.

Application filed January 26, 1891. Serial No. 379,079. (No model.)

*To all whom it may concern:*

Be it known that we, GIULIO MARCHETTI, residing at Halifax, England, and HERBERT CROSSLEY, residing at London, England, subjects of the Queen of Great Britain, have invented new and useful Improvements in Machines for Printing Yarns, of which the following is a specification.

Our invention relates to improvements in machinery for printing yarns in what are termed "spaced colors," suitable for being used more particularly in the manufacture of tapestry and tapestry-velvet carpets, rugs, and similar fabrics.

In the machinery at present employed for printing yarns for use in the manufacture of the above-named fabrics the yarn to be printed is wound upon a drum, and the printing is usually effected by means of traveling color-boxes, each carrying a disk, or what is termed in the trade a "pulley," the said pulleys revolving in the coloring-matter contained in the traveling color-boxes and printing upon the yarn as the traveling color-boxes pass from side to side of the drum. It has also been proposed to employ sticks or rulers covered with felt and supplied with color from a sieve and applied horizontally across the breadth of the drum.

According to our invention, instead of using traveling color-boxes carrying disks or pulleys traveling under the drum, we make use of what we term "color" or "printing" bars and "color-troughs."

Our color or printing bars and color-troughs are situated under the drum and the color-bars are adapted during the operation of printing to have an up-and-down movement communicated to them, while the color-troughs remain stationary, so that they may slip into the troughs. The color or printing bars are raised and lowered by any suitable mechanical contrivance, and springs can with advantage be used to regulate the pressure of the bars against the drum. The portions of the color-bars which are to be brought into contact with the yarn during the operation of printing are dipped into the troughs and are coated with the coloring-matter in the color-troughs. When brought into action, the required color-bar is raised, so that the upper or printing portion or portions of the said color-bar is or are pressed against the yarn on the drum, and one "scroll" or line is thereby printed across the yarn on the drum. The said color-bar is then returned to the color-trough, and if another scroll or line of the same color is required to be printed the drum is moved to the required position and the color-bar is again raised, as before described, so as to print another scroll or line across the yarn on the drum. When another color is required to be printed, the color-bar and color-trough are, in the manner hereinafter described, moved out of the way and another color-bar and color-trough substituted, the color-trough containing coloring-matter of the required shade, and the operation is repeated as above described.

The faces of the color-bars may with advantage be grooved or fluted or concave, and they may be in some cases provided with fixed or movable sides projecting above the faces of the color-bars.

In some cases we find it advantageous to form the periphery of the drum of iron or other suitable metal instead of the wooden lags hitherto usually employed, the metal periphery being covered, if found necessary, with india-rubber, felt, or other analogous material.

In order to enable our invention to be fully understood we will describe how it can be carried into practice by reference to the accompanying drawings, in which—

Figure 8:
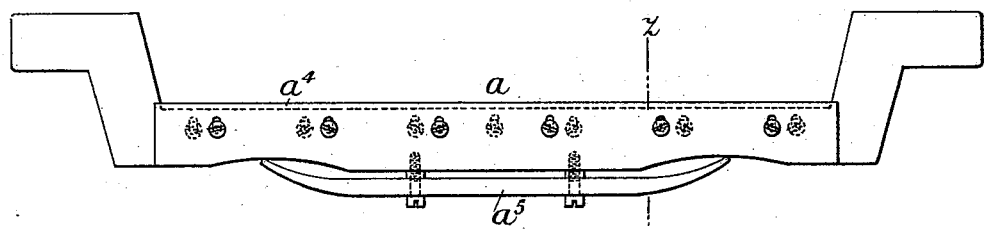
Figure 9:
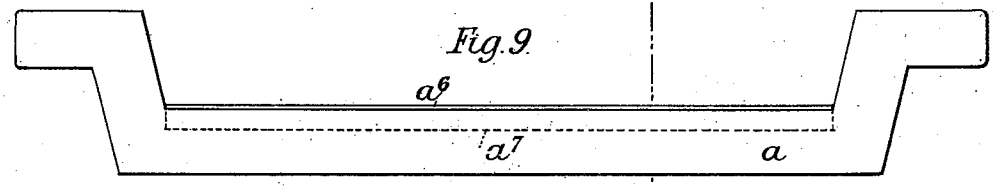

Figures 1 and 2 are respectively views of opposite sides of a machine for printing yarns constructed with our improvements. Fig. 3 is a front elevation of the same. Figs. 4 and 5 are respectively a plan and elevation of a detail drawn to an enlarged scale. Fig. 6 is a side view of our color or printing bar, and Figs. 7, 8, and 9 are side views, and Fig. 10 a sectional view, of modifications drawn to an enlarged scale of the same. Figs. 11, 12, 13, and 14 are respectively sections drawn to an enlarged scale on the lines $xx$, $yy$, $zz$, and $z'z'$ of Figs. 6, 7, 8, and 9; and Figs. 15, 16, 17, and 18 are similar views to Figs. 11, 12, 13, and 14, but illustrating modifications.

Similar reference-letters indicate similar or corresponding parts throughout the drawings.

$a\ a\ a$ represent our color or printing bars, a number of which, as shown in Figs. 1, 2, and 3, are placed under the drum $b$ of the machine, and which drum may be of ordinary construction, but which we prefer to construct as hereinafter described.

$c\ c\ c$ represent the color-troughs of the color-bars. These color-troughs $c$ are mounted on a sliding table $c'$, supported and working on slides $c^2$, attached at their extremities to cross-rails $A'$, secured to the frame $A$ of the machine. To the sliding table $c'$ is secured a bracket $c^3$, provided with a female screw-thread designed to engage with the male screw-thread of a screw $d$, the said screw being supported and having its bearings in brackets $d'$, secured to the rails $A'$. By turning the screw $d$ the table $c'$ is caused to move along the slides $c^2$, so as to bring each color-trough with its color or printing bar into position for printing. Motion is given to the said screw by means of a series of bevel-wheels $e$, which are actuated by a handle $e'$. We advantageously provide a recessed stop $e^2$ for the reception of the handle $e'$, so as to serve as an indicator to show when one of the color-troughs with its color or printing bar is in the position for printing, the movement of each consecutive trough and bar into such position being effected by one revolution of the said handle.

Our color or printing bars $a$ are shaped, as shown, so that when at rest their central portions extend or pass into the troughs $c$, and their ends are supported in recesses forming guides $c^4$ at the ends of the said troughs. The ends of the bars project through the said recesses, so as to allow the bars to be lifted up, as hereinafter described, to print the yarn on the drum $b$.

In order to operate each color-bar for the purpose of printing the yarn, we provide compound slides $f$, which are located beneath the center of the drum $b$ and serve (when each color-trough is moved, as hereinbefore described, so as to bring the ends of its color-bar over the said slides) to lift the said bar from the trough and into contact with the yarn on the drum $b$. Each of the compound slides $f$, as shown clearly in Figs. 4 and 5, consists of two slides $f'$ and $f^2$, the slide $f'$ sliding in a supporting-bracket $f^3$, secured to the frame $A$, and the slide $f^2$ sliding in the slide $f'$.

$f^4$ are springs for regulating the pressure of the color-bars when moved against the yarn by the compound slides, they being located in recesses in the slides $f'\ f^2$. The said springs serve to support the slides $f^2$ in the slides $f'$ and are therefore more or less compressed when the color-bars are brought into contact with the yarn, according to the degree of movement imparted to the said bars by the compound slides.

$f^5$ are recesses in the upper ends of the slides $f^2$, which engage with the ends of the color-bars when lifting the same. It will be seen that the slide $f^2$ of the compound slide $f$ at the side of the drum $b$, from which the yarn is "stripped," can be lifted from its place when such "stripping" occurs. The movement of the compound slides $f$ is effected by means of a cam $g$ through the medium of levers $g'$, shaft $g^2$, lever $g^3$, rod $g^4$, and lever $g^5$, the latter being provided with a roller $g^6$, which bears on the cam $g$. The said cam rotates on a shaft $h$, fixed in brackets $h'$ on extensions $B$ on the frame $A$, and is operated from the driving-pulley $i$ through the medium of a spur-wheel $i'$, pinion $i^2$, and shaft $i^3$, the cam $g$, together with a cam $j$, being attached to the wheel $i'$. The said cam $j$ serves to rotate the drum $b$ in the usual manner. The pinion $i^2$ forms part of a clutch and is loose on the shaft $i^3$, the other part $i^4$ of the clutch being arranged to slide on a spline on the said shaft $i^3$. The clutch $i^2\ i^4$ serves to connect the mechanism for rotating the drum $b$ and for lifting the color or printing bars $a$ with the driving-pulley $i$ and is thrown in and out of gear by any well-known means, such as by means of a lever.

The operation of printing yarn by the mechanism hereinbefore described is as follows—that is to say: Assuming that the drum $b$ has been covered in the usual manner with the yarn to be printed and the color-troughs $c$, containing the necessary colors, and our color or printing bars $a$ be arranged in any required order on the table $c'$, if the said table be moved by its handle $e'$ so as to bring one of the color-troughs and its bar centrally above the compound slides $f$ and the cam $g$ be revolved in the direction of the arrow, Fig. 3, the said compound slides will be raised, and during their upward movement their recesses $f^5$ will embrace the said color-bar and carry it with them in their upward movement until the face of the bar is brought into contact with the yarn on the drum $b$, so as to print a line or "scroll" on the yarn, the upward movement of the slide $f'$ of the said compound slide being continued until the necessary amount of pressure is brought to bear upon the color or printing bar by the compression of the springs $f^4$. It will be obvious that the strength of the springs $f^4$ can be varied in order to suit various kinds of yarns. After printing such line or scroll the compound slide is lowered, carrying with it the color-bar, which during the downward movement is returned to the color-trough and again immersed in the color, the downward movement of the slides $f$ continuing until the recesses $f^5$ are disengaged from the ends of the color-bar. The drum $b$ must then be rotated by the cam $j$, in the usual well-known manner, for the yarn to be brought into position to receive another line or scroll, and should it be desired to print another line or scroll of the same color as that of the last line or scroll the cam $g$ will cause a repetition of the movements above described to take place. Should it, however, be desired to print a line or scroll of a different color, the sliding table $c'$ must be operated by its handle $e'$, so as to bring the color-trough containing the required color and its color-bar into position above the compound slides, and the printing will be effected in a similar manner to that above described.

Figure 10:
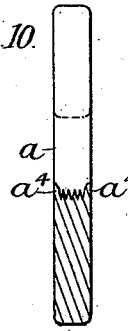
Figure 13:
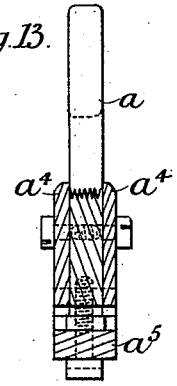
Figure 17:
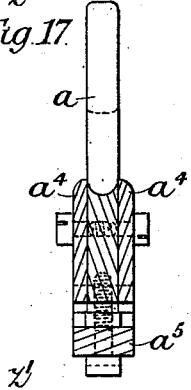
Figure 14:
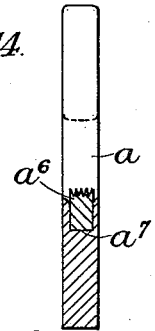
Figure 18:
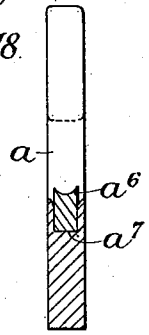

Our color-bars can, as shown in Figs. 10 to 14, be grooved or fluted on the face or printing-surface, and, in order to increase the stability of the said bars, we sometimes, as shown in Figs. 7 and 12, provide each of them with a tie-rod $a'$, the ends of which pass through lugs $a^2$ on the bar, so that it can be put in tension by means of nuts $a^3$. In some cases we provide each of the said bars with movable sides $a^4$, as shown in Figs. 8 and 13, which sides project above the face or printing-surface of the bar and form a trough for the color, and are kept in such position by means of a spring $a^5$, attached to the bar by screws, as shown, so that when the bar is brought into contact with the yarn the sides $a^4$ are caused to yield, and the face of the bar is brought against the said yarn. In Fig. 10 the sides of the bar are shown fixed or integral with the bar. We sometimes also form the face or printing-surface of each bar on a separate strip or block $a^6$, of india-rubber or other suitable material, as shown in Figs. 9 and 14, the said strip or block being held in a groove $a^7$ in the bar. In Figs. 15, 16, 17, and 18 the color-bars are shown with concave printing-surfaces.

We will now describe, by reference to Figs. 1, 2, and 3, the drum, which we find it advantageous to employ in combination with our color bars and troughs. $b'$ is the periphery of the said drum $b$, which periphery we find may be most advantageously made of iron, and is connected by means of arms $b^2$ to bosses $b^3$, keyed on a hollow shaft $b^4$. The periphery $b'$ is covered with a covering $b^5$ of flexible material—such as india-rubber—attached to the said periphery and to the leaves, hereinafter described, of the drum.

$k$ are rings secured to the bosses $b^3$ by means of arms $k'$, each ring being formed in two pieces, which are held together by bolts and nuts $k^2$ and clip the arms $b^2$ and $k'$. Upon each ring $k$ are two projections $k^3$, to which are secured stays $l$, which serve to stay the fixed portions of the periphery $b'$ together through the medium of brackets $l'$ and studs $l^2$.

In order to facilitate the stripping of the drum—that is to say, the removal of the printed yarn from the same—it is provided with two pairs of leaves $m$, which are hinged on the studs $l^2$. The said leaves are held in their closed position, as shown by the full lines in Fig. 1, by links $n$ and $o$, which are secured by means of studs $p$ to extensions $p'$ $p^2$ on a segmental spur-wheel $q$, which wheel can turn freely upon the shaft $b^4$, it being held in place by the bosses $b^3$.

$r$ is a spur-pinion which gears with the teeth of the wheel $q$, the said pinion being keyed on a shaft $r'$, supported by brackets secured to the rings $k$ and having a hand-wheel $r^2$ keyed thereon, the said wheel serving, by means of the pinion $r$, to rotate the wheel $q$ and move the leaves $m$ into the position shown by the dotted lines in Fig. 1, so as to enable the drum $b$ to be stripped. Through a screw-threaded hole in one of the rings $k$ works a screw $s$, to one end of which is secured a hand-wheel $s'$, the said screw when the leaves of the drum $b$ are closed preparatory to printing being screwed up, so that its other end enters a hole in the projection $p'$ of the segmental wheel $q$, thus securing the said wheel and keeping the leaves closed. When it is desired to open the leaves $m$, as hereinbefore described, the screw $s$ must be withdrawn from the hole in the wheel $q$, as will be obvious. The links $n$ are each constructed in two pieces to facilitate their adjustment to the required length by means of bolts and nuts $n'$ and slots $n^2$. The links $n$ are provided toward one extremity with slots $n^6$, which slots enable the links $n$ to slide freely upon the pins $p$ during the movement of the segmental wheel $q$, and by this means prevent the leaves from being forced beyond the normal circumferential line of the drum when the links $n$ come into the radial line. In the slots $n^2$ are also secured studs $n^3$ by means of nuts $n^4$, rollers $n^5$ being arranged on the said studs, so as to roll against the links $o$ as the leaves $m$ are being opened, in order to prevent the leaves of each pair from coming in contact.

The drum $b$ is filled in the well-known manner by the usual mechanism carried by the brackets $t$ and $t'$, and we find it advantageous, as hitherto, to wind a sheet of oil-cloth round the said drum before filling with yarn.

The frame A on one side of the drum is provided with the hinged portion $A^2$, which can be let down in the usual manner when stripping the drum, and upon the said hinged portion is mounted a pedestal $u$, supporting one end of the shaft $b^4$, the said pedestal being provided with a hinged cap $u'$, secured by means of a screw $u^2$, provided with a hand-wheel $u^3$. The shaft $b^4$ is also supported by a pedestal $v$, mounted on the frame A at the side of the drum opposite to the hinged portion $A^2$, and in order to facilitate the opening of the said hinged portion the said pedestal $v$ is hinged to its base, as shown at $v'$, Fig. 3. When it is necessary to strip the drum $b$, the pedestal-cap $u'$ is released by means of the screw $u^2$, and the pedestal $v$, acting as a fulcrum for the shaft $b^4$, the end of the shaft farthest from the drum is depressed by an eye-bolt $v^2$, thereby allowing the hinged portion $A^2$ of the frame A to be let down. To enable the eye-bolt $v^2$ to be operated to depress the end of the shaft $b^4$, as described, it is provided at its lower end with a male screw-thread, which engages with a corresponding female screw-thread in a hand-wheel $v^3$, the said eye-bolt passing freely through a bracket $v^4$, secured to the cross-rail B' on the extensions B.

Having now particularly described and ascertained the nature of our said invention and in what manner the same is to be performed, we declare that what we claim is—

1. In machinery for printing yarns in spaced colors, color or printing bars, in combination with color-troughs, and means for bringing each color-bar and its trough into the required position under the drum of the machine, and for communicating a vertical upward movement to the said color-bar for printing the line or scroll and for returning the bar to its trough, substantially as described.

2. In yarn-printing machinery, the combination, with the drum, of color-troughs and color-bars, means for shifting the color-troughs to bring the desired color-bar beneath the drum, and the slides $f$, all substantially as set forth.

3. The combination, with color-bars such as those herein described, of color-troughs having recesses at their ends to receive the ends of said bars, means for shifting the color-troughs to bring the desired color-bars beneath the drum, and means for raising and lowering said bars, substantially as described.

4. In machinery for printing yarns, the combination, with the drum and with the color bars and troughs, of the mechanism, substantially as described, for operating said bars and troughs, consisting of devices serving to shift the trough with the desired bar directly beneath the drum and to raise the bar as needed into contact with the yarn on said drum.

5. In machinery for printing yarns, having color bars and troughs such as herein described, a drum constructed with hinged leaves $m$ and links $n$ and $o$, and devices, substantially as described, for securing the links in position to hold the leaves in their operative position, and means for operating the links to withdraw said leaves to allow for stripping, substantially as and for the purposes set forth.

6. The combination of parts forming the improved machine for printing yarns in spaced colors, consisting of a movable table, the color bars and troughs constructed and operating as set forth, compound slides $f f'$, the drum provided with hinged leaves and links, as described, and the frame having the hinged portion $A^2$, all substantially as set forth.

GIULIO MARCHETTI.
HERBERT CROSSLEY.

Witnesses to the signature of Giulio Marchetti:
BRADLEY BROWN,
J. BROOKE DEWHIRST.

Witnesses to the signature of Herbert Crossley:
W. O. ROPER,
*Notary Public, Lancaster, England.*
WM. H. LORD,
*Solicitor's Clerk, Lancaster.*